United States Patent [19]

Dinger et al.

[11] 4,215,550
[45] Aug. 5, 1980

[54] SUPERCHARGED INTERNAL COMBUSTION ENGINE AND METHOD OF OPERATION THEREOF

[75] Inventors: Hans Dinger; Robert Schulmeister, both of Friedrichshafen, Fed. Rep. of Germany

[73] Assignee: Motoren- und Turbinen-Union Friedrichshafen GmbH, Fed. Rep. of Germany

[21] Appl. No.: 877,031

[22] Filed: Feb. 10, 1978

[30] Foreign Application Priority Data

Feb. 17, 1977 [DE] Fed. Rep. of Germany ....... 2706696

[51] Int. Cl.² .............................................. F02B 37/00
[52] U.S. Cl. ........................................ 60/606; 60/605
[58] Field of Search ................. 60/605, 606, 614, 615; 415/163

[56] References Cited
U.S. PATENT DOCUMENTS

| 2,216,494 | 10/1940 | Kurtz et al. | 60/606 |
| 3,423,927 | 1/1969 | Scherenberg | 60/606 |
| 3,775,971 | 12/1973 | Gadefelt | 60/606 X |
| 3,972,644 | 8/1976 | Johnson | 415/163 |
| 4,078,387 | 3/1978 | Melchior | 60/606 |

Primary Examiner—Michael Koczo
Attorney, Agent, or Firm—Craig & Antonelli

[57] ABSTRACT

An internal combustion engine and a method of operating the same, which engine includes a supercharger having an exhaust gas turbine and a charging air compressor with a charging air line supplying charging air to the internal combustion engine. A bypass line is provided for connecting the charging air line with the exhaust gas line and a combustion chamber is disposed in one of the exhaust gas line and the bypass line. A return line for recycling exhaust gases branches off from the line in which the combustion chamber is disposed and a connecting line is provided for connecting the exhaust gas line with the charging air line. Arrangements are provided for at least one of selectively restricting and blocking at least one of the charging air line, bypass line, exhaust gas line and return line.

6 Claims, 4 Drawing Figures

SUPERCHARGED INTERNAL COMBUSTION ENGINE AND METHOD OF OPERATION THEREOF

The present invention relates to a piston engine and, more particularly, to a supercharged internal combustion piston engine which includes an exhaust gas turbine, a supercharging compressor, a bypass line connecting a charging or booster air line with an exhaust gas line, and a combustion chamber disposed in a line between the charging or booster air line and the exhaust gas turbine.

Arrangements have been proposed for cutting in and out the combustion chamber to support the exhaust gas turbocharger in those operating states in which the internal combustion engine itself does not produce sufficient exhaust gases. In such proposed arrangements, expensive additional assemblies are required to actuate the combustion chambers such as, for example, electrically driven auxiliary blowers, compressed air reservoirs whith shutoff, switching, and recharging devices, and/or auxiliary drives for the exhaust gas turbocharger with connecting and disconnecting devices to produce the required air throughput or throughflow through the combustion chamber for ignition.

Under extreme starting conditions with, for example, low air temperatures and/or low compression ratios in the internal combustion engine, it is necessary to, for example, employ a precompression of the charging or booster air and a preheating of such air in order to ensure a reliable starting. While heating devices for heating aspirated air in the charging or booster air line have been proposed for facilitating and/or permitting starting of an internal combustion engine, installation of the heating devices and/or combustion chambers in duplicate together with the necessary control devices results in a considerable construction cost.

The aim underlying the present invention assentially resides in providing an internal combustion engine arrangement which includes a combustion chamber for achieving an intensive preheating of the charging air for the internal combustion engine in addition to starting and supporting an exhaust gas turbocharger.

According to one advantageous feature of the present invention, a restricting and/or blocking means is arranged in an exhaust gas line extending between a combustion chamber and an end of the exhaust gas line with an exhaust gas return line, capable of being restricted and/or shut off, branching off from the exhaust gas line at a position between the combustion chamber and the restricting and/or blocking means with the return line terminating in the charging air line.

In a piston-type internal combustion engine in which a combustion chamber is disposed in a bypass line, according to another advantageous feature of the present invention, the exhaust gas return line branches off from the bypass line at a position between the combustion chamber and the exhaust line with a valve means being provided for simultaneously or alternately restricting and/or shutting off the return line and the passageway of the bypass line between the point at which the return line branches off and the exhaust gas line.

In accordance with further features of the present invention, the air is aspirated into the piston engine through the bypass line, return line, and through the combustion chamber when the engine is being started with the combustion chamber being started by adding fuel and igniting the same to heat the aspirated air from the piston engine with the piston engine then being started by injecting fuel into the combustion spaces thereof.

By virtue of these last-mentioned features, a vacuum effect of the engine can be used to start the combustion chamber without problems or any special starting devices when starting up the internal combustion engine and it is also possible to simultaneously achieve efficient heating of the charging air for the engine.

According to the present invention, aspirated air from the internal combustion engine may have additional air or exhaust gas added thereto from the exhaust gas line by virtue of the provision of restricting and/or blocking means in the exhaust gas line upstream of the exhaust gas turbocharger with the restricting and/or blocking means being in the form of control valves and/or adjustable vanes in the exhaust gas turbocharger. By virtue of these measures, the air heated by the compressive efforts of the internal combustion engine or the exhaust gas coming from the exhaust line is mixed with the exhaust gases from the combustion chamber and fed to the charging air.

When using an exhaust gas turbine which can be regulated by means of adjustable vanes which can be used advantageously as a restricting or blocking means in the exhaust gas line, the overall construction of the engine of the present invention can be considerably simplified.

In accordance with yet another feature of the present invention, immediately after starting or even during a starting phase, the exhaust gases from the combustion chamber are available for accelerating the exhaust gas turbocharger and/or for operating the exhaust gas turbocharger with the piston engine under a partial load operation.

According to the present invention, the exhaust gases are supplied to the combustion chamber in dependence upon the requirements of the engine and exhaust gas turbocharger and as a function of operating parameters and the operating state of the engine as well as the charging air for preheating and exhaust gases from the piston engine to support the drive of the exhaust gas turbocharger whereby operating with preheating of the charging air and simulataneous support of the exhaust gas turbine is possible during starting and under partial load operation of the engine so that a transition can be made from preference for preheating chargin air to increasing support for the exhaust gas turbine depending on thhe requirements.

According to yet another advantageous feature of the present invention, additional restricting and/or shutoff means are provided in the chargin air line downstream of the point at which the bypass line branches off and in the bypass line upstream of the combustion chamber with yet another restriction and/or blocking means being arranged in the bypass line leading from the combustion chamber to the branch-off position. The restriction and/or blocking means are continuously variable and control the throughflow by varying the cross-section of the respective lines thereby providing for a continuous adjustment of the individual gas streams in response to the changing operating parameters and operating states of the internal combustion engine.

For optimum conditions, with varying operating states, in accordance with the present invention, restricting and/or blocking means which can be fixed or set permanently can be disposed in a valve arrangement to determine the volume as well as the volume ratio of the individual gas streams.

The restricting and/or blocking means according to the present invention may advantageously be constructed as either individual valves and/or flat valves or as a single multipath valve. With individual flat-type valves,, there is provided a greater variety of possible means of regulation and variation; whereas, the single multipath valve offers the advantages of low cost and limited space requirements.

To provide additional support for heating the charging air, the exhaust gases from the combustion chamber and the internal combustion engine can be recycled to the charging air line according to the present invention by providing a connecting line which includes a blocking and/or restricting means with the connecting line extending from a point upstream of the exhaust gas turbocharger to the chargin air line.

Th recycling of thhe exhaust gases can also be accomplished in accordance with the present invention by providing a connecting line extending from th exhaust gas line to the charging air line with the connecting line including a restricting and/or blocking means and with a further restricting and/or blocking means being disposed in the exhaust gas line downstream of a point at which the connecting line branches from the exhaust gas line.

A charging air cooler may be operatively connected to or disposed within the charging air line according to the present invention in order to achieve a high charging air input to the cylinders of the internal combustion engine under a full load operation.

Advantageously, according to the present invention, the charging air is heated during the starting process and under a partial load operation of the internal combustion engine. For this purpose, the bypass line branches off from the charging air line upstream of a charging air cooler with thhe return line terminating in the charging air line downstream of the charging air cooler. Restriction and/or blocking means are provided in the bypass line for conrolling the throughflow of the air to the charging air cooler.

An electrically driven auxiliary blower may be provided for supplying auxiliary air to the combustion chamber to enhance the operation thereof. In contrast to the conventional auxiliary blowers required to start the combustion chamber, the auxiliary blower in accordance with the present invention can be constructed with relatively small dimensions since the blower supplies the combustion chamber with additional air only when required in order to achieve a smooth combustion.

The internal combustion engine according to the present invention allows for an advantageous use of a process for a zero-load and partial-load operation to achieve good acceleration capability by feeding the total volume of exhaust gases from the combustion chamber together with the exhaust gases from the internal combustion engine to the exhaust gas turbocharger thereby producing a high charging air pressure.

With low compression in the internal conbustion engine, at zero-load and partial-load operation, to ensure sufficient ignition conditions, according to the present invention, all of the exhaust gases from the combustion chamber are added to the charging air by way of a return line in order to preheat the charging air.

To facilitate the supply and control of the supply of the exhaust gases from the combustion chamber and the internal combustion engine to the charging air, a valve arragnement is provided for adding the exhaust gases together and directing the exhaust gases to the charging air line.

According to the present invention, with a low compression ratio, in order to ensure sufficient ignition conditions in the internal combustion engine, all of the exhaust gases from the piston engine are fed to the exhaust gas turbine to produce a high charging pressure and the charging air is supplies to the internal combustion engine by bypassing a charging air cooler.

Accordingly, it is an object of the present invention to provide an internal combustion engine and method of operating the same which avoids by simple means the disadvantages and drawbacks encountered in the prior art.

Another object of the present invention resides in providing an internal combustion engine and method of operating the same which facilitates and/or improves and, under extreme conditions, makes possible the starting and operation of the engine equipped with an exhaust gas turbocharger.

A further object of the present invention resides in providing an internal combustion engine and method of operating the same which utilizes a combustion chamber to achieve an intensive preheating of the charging air while nevertheless reducing the overall construction costs of the engine.

Yet another object of the present invention resides in providing an internal combustion engine and method of operating the same which eliminates the previously required additional starting assemblies for starting the combustion chamber.

A still further object of the present invention resides in providing an internal combustion engine and method of operating the same which functions reliably under all operating conditions.

These and other objects, features, and advantages of the present invention will become more apparent from the following description when taken in connection with the accompanying drawings which show, for the purposes of illustration only, several embodiments of an internal combustion engine in accordance with the present invention, and wherein.

Figure 3:
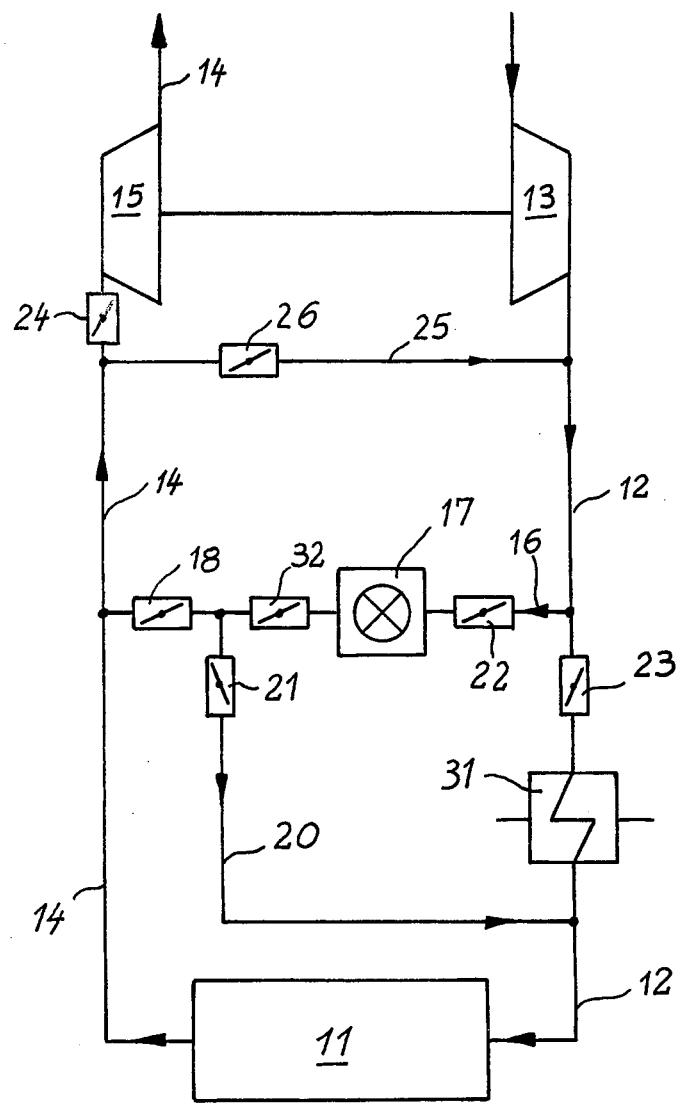
Figure 4:
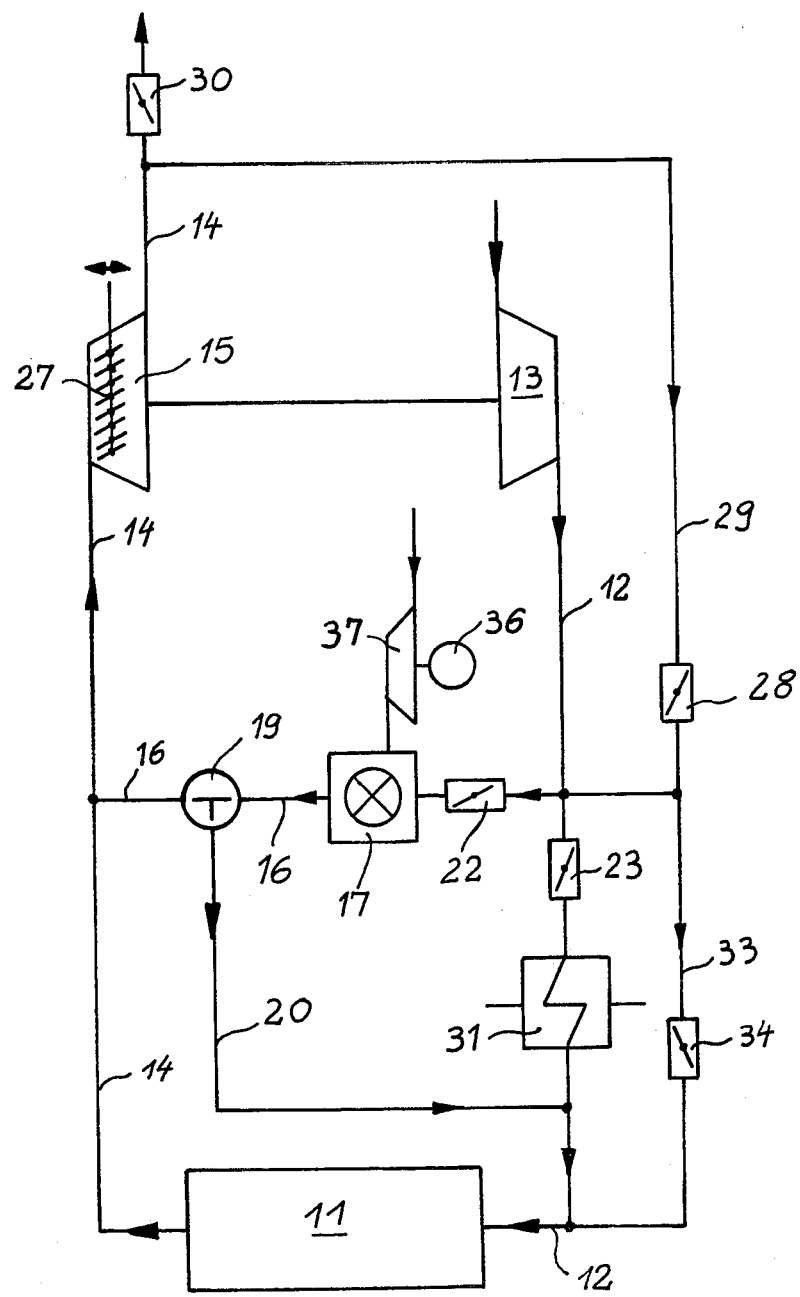

FIG. 3 is a schematic representation of a further embodiment of an internal combustion engine in accordance with the present invention with a charging air cooler and an additional exhaust gas feedback; and FIG. 4 is a schematic representation of yet another embodiment of an internal combustion engine in accordance with the present invention with an exhaust gas feedback, guide vane control of an exhaust gas turbocharger, and an additional auxiliary blower for the combustion chamber.

Figure 1:
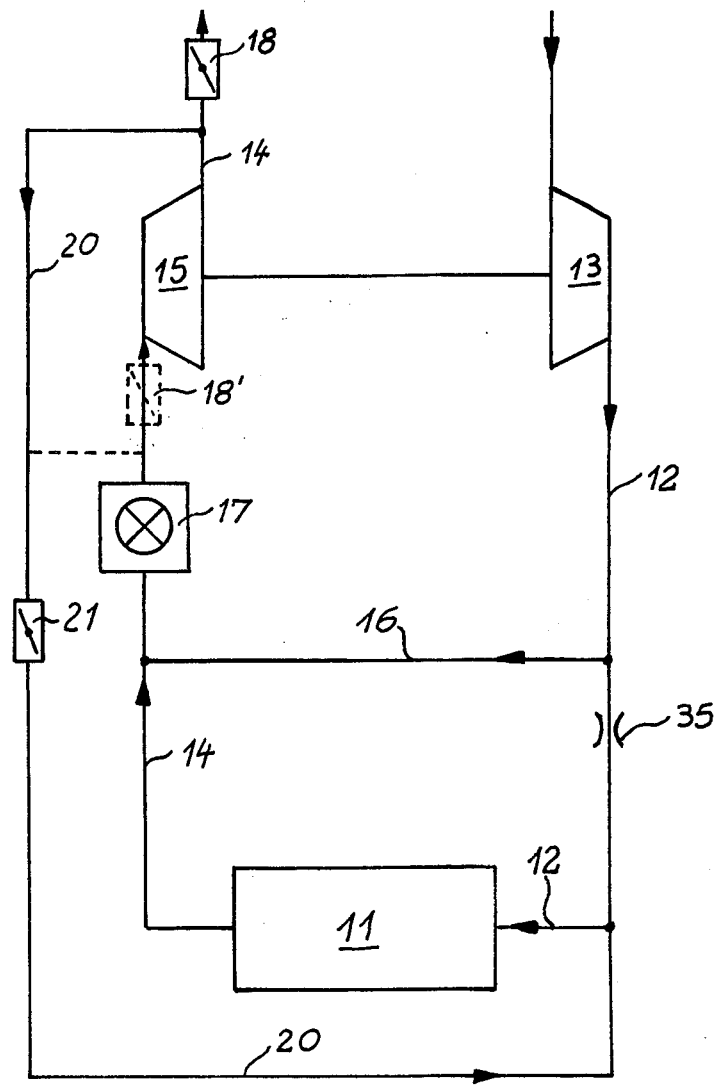
FIG. 1 is a schematic representation of a first embodiment of a supercharged internal combustion engine with a combustion chamber arranged in an exhaust gas line.

Referring now to the drawings wherein like reference numerals are used throughout the various views to designate like parts and, more particularly, to FIG. 1, according to this figure, an internal combustion piston engine 11 is connected by way of a charging air line 12 with a compressor 13 and by an exhaust gas line 14 to an exhaust gas turbine 15. A bypass line 16 is disposed between the charging air line 12 and the exhaust gas line 14. A portion of the exhaust gas line 14 between the piston engine 11 and the exhaust gas turbine 15 includes a combustion chamber 17. A portion of the exhaust gas line 14 between the exhaust gas turbine 15 and an end of the exhaust gas line 14 is provided with a restricting and/or blocking means such as, for example, a single valve 18. A return line 20 branches off from a portion of the exhaust gas line 14 between the exhaust gas turbine 15 and the valve 18 with the return line 20 terminating in the charging air line 12. A restricting and/or blockgin valve 21 is provided for restricting and/or cutting off the flow of exhaust gases through the return line 20.

In the embodiment of FIG. 1, the combustion chamber 17 is disposed in the exhaust gas line 14 upstream of the exhaust gas turbine 15 and the valve 18 is disposed at the end of the exhaust gas line 14 downstream of the exhaust gas turbine 15. As shown in dotted line, the return line 20 may branch off the exhaust gas line 14 at a position between the exhaust gas turbine 15 and the combustion chamber 17 upstream of the exhaust gas turbine 15. However, as shown in dotted lines, in lieu of the valve 18, it is possible to dispose a restriction and/or blocking means such as a valve 18' upstream of the exhaust gas turbine 15.

Figure 2:
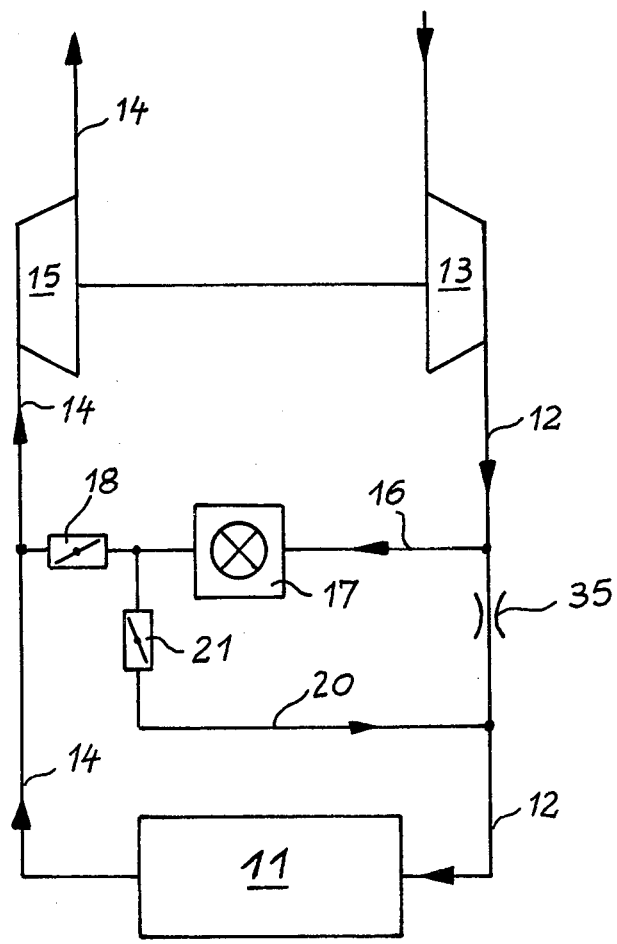
FIG. 2 is a schematic representation of another embodiment of the internal combustion engine in accordance with the present invention with a combustion chamber disposed in a bypass line.

As shown in FIG. 2, the combustion chamber 17 is disposed in the bypass line 16 extending between the chargin air line 12 and the exhaust gas line 14 with the return line 20 branching off from the bypass line 16 at a point between the combustion chamber 17 and the exhaust gas line 14. The valve 18 is disposed in the bypass line 16 between the branching place of the return line 20 and the exhaust gas line 14. It is also possible to branch off the return line 20 from the exhaust gas line 14 and to dispose the valve 18 in the exhaust gas line 14 in the manner illustrated in FIG. 1.

As shown in FIG. 3, a restricting and/or blocking means such as a valve 24 is disposed in the exhaust gas line 14 upstream of the gas turbine 15 whereby exhaust gases from the internal combustion engine 11 and from the combustion chamber 17 disposed in the return line 16 can be recycled back to an exhaust gas return through a connecting line 25 which is controlled by a valve 26 for restricting and/or blocking the connecting line 25. By virtue of this arrangement, it is possible to preheat the aspirated air especially during an idle operation and with the internal combustion engine 11 operating at a low load level. Before the piston engine 11 is started, the aspirated, compressed, and thereby additionally heated charging air can be mixed with the exhaust gases from the combustion chamber through the valve 18 and reaspirated. After the necessary air temperature is reached in the internal combustion engine 11, fuel is then injected into the combustion spaces of the engine in a conventional manner.

A charging air cooler 31 is disposed in the charging air line 12 and is bypassed by a bypass line 16 and return line 20 as the charging air is heated up. An additional restricting and/or blocking means such as a valve 32 is disposed between the combustion chamber 17 and the branching off point of the return line 20 for the bypass line 16.

A restricting and/or blocking means such as, for example, a valve 22 is located upstream of the combustion chamber 17 for controlling the throughflow through the combustion chamber 17 and an additional restricting and/or blocking valve 23 is disposed in the charging air line upstream of the charging air cooler 31.

By closing the control valve 18, the exhaust gas from the combustion chamber 17 may be directed into the chargin air line or intake line of the internal combustion engine 11. With the valves 18, 22, 26, 32, in an opened position and the valve 24 in a closed position, the exhaust gas from the combustion chamber 17 can be routed through the exhaust line 14 and connecting line 25 into the charging air line 12. When starting the piston engine 11, the valve 23 is completely closed and the valve 22 is completely opened. In lieu of the valve 24, the exhaust gas turbine 15 could be provided with adjustable guide vanes 27 (FIG. 4) to achieve the same blocking and/or restricting functions.

As shown in FIG. 4, another connecting line 29 is provided in which is arranged a restricting and/or blocking means such as, for example, a valve 28. A further restricting and/or blocking means, for example, a valve 30, is provided in the exnaust gas line to slow down and/or control the flow of the exhaust gases in the exhaust gas line 14. A bypass line 33, provided with a restricting and/or blocking means such as a valve 34, is provided for bypassing the charging air cooler 31. With the valve 23 in a closed position and the valve 34 in a opened position, the bypass line 33 is cut in advantageously when the exhaust gases from the combustion chamber are used to drive the exhaust gas turbine and the compressed charging air is to be supplied to the piston engine without significant cooling.

An auxiliary blower 37, driven by an electric motor 36, is provided at the combustion chamber 17 and serves to improve the combustion process in the combustion chamber 17 and to reduce the quantity of pollutants in the exhaust gases. The auxiliary blower 37 supplies the combustion chamber 17 with additional air only when required in order to achieve a smooth combustion.

In the FIG. 4 embodiment, the single valve 18 and valve 21 are integrated into a valve arrangement 19 which functions to control the exhaust gas flow in the same manner as the valves 18, 21. In this manner, ever when the combustion chamber 17 is switched off, the exhaust gases can be recycled through the return line 20. The valves 22, 23 are provided in the bypass line 16 and charging air line 12 for respectively controlling the flow through the combustion chamber 17 and the charging air cooler 31. As with the embodiment of FIG. 3, the charging air cooler 31 in the charging air line 12 is bypassed by the bypass line 16 and return line 20 when the charging air is being heated up.

During a starting operation, the piston engine 11 creates a suction by way of the compressor 13, chargin air line 12, bypass line 16, through combustion chamber 17, by way of valves 18, 21 and/or valve arrangement 19, return line 20 and again through a section of the charging air line 12. At this time, the valve 18 and/or valve arrangement 19 is closed. In the embodiments of FIGS. 1 and 2, by providing an appropriate diameter ratio between the charging air line 12 on the one hand and the bypass line 16 and return line 20 on the other hand, indicated schematically by a restriction 35 in the charging air line 12, most of the aspirated air is passed through the combustion chamber 17.

When fuel is injected into the combustion chamber 17 and ignited in a known manner, the ignition chamber 17 is started and the aspirated air intensively preheated. In this fashion, unfavorable ignition conditions such as, for example, a low compression ratio in the internal combustion engine 11 and/or low outside air temperatures can be compensated so that the injection of fuel into the internal combustion engine 11 then permits the same to readily start.

As the piston engine 11 heats up further, the exhaust gases from the combustion chamber 17 can be used to drive the exhaust gas turbine 15 in the idle and partial load modes by closing valve 21 and opening valve 18 and/or by actuating valve arrangement 19. The continuously adjustable restricting and/or blocking means allows this transition to be accomplished continuously as a function of, for example, the charging air pressure, aspirated air temperature and/or cooling water temperature, and speed of the internal combustion engine 11 and/or exhaust gas turbine 15. These meansures allow recharging pressure to be increased and the rotational speed of the internal combustion engine 11 to be increased in a much shorter period of time.

When the exhaust gas turbine 15 has reached its maximum speed with the internal combustion engine 11 at a peak load, and the charging air has reached its prescribed level, the combustion chamber 17 can be cut out. Restricting and/or blocking valves 18, 21, and/or valve arrangement 19, and restricting and/or blocking valves 22, 26, 28, and 34 are closed and restricting and/or blocking valves 23, 24 and 30 are opened. Operation of the piston engine 11 then proceeds in a conventional manner.

the restricting and/or blocking valves hereinabove can be controlled by conventional electronic means which adjust the respective valves in response to operating parameters and/or operating conditions of the internal combustion engine 11. The valves may, for example, be flat-type valves driven electrically as a function of the operating parameters and suitable conventional means may be provided for controlling the ignition and/or fuel metering for the internal combustion engine 11.

To start the engine 11, the engine aspirates air through the bypass line 16, return line 20, and through combustion chamber 17 with the combustion chamber being started by adding fuel and igniting the same, thereby heating the aspirated air from the engine 11. The engine 11 is then started by injecting fuel into the combustion spaces thereof. Additional air and/or exhaust gases from the exhaust gas line 14 may be added to the aspirated air. In operating the engine 11, the exhaust gases are supplied to the combustion chamber 17 in dependence upon the requirements of the internal combustion engine 11 and the exhaust gas turbine 15 and as a function of the operating parameters and/or operational state of the engine 11, the preheating of the charging air, and the required amount of exhaust gases from the internal combustion engine 11 necessary to support the drive of the exhaust gas turbine 15.

For zero-load and partial-load operation of the engine 11, in order to achieve good acceleration, the total volume of the exhaust gases from the combustion chamber 17 together with the exhaust gases from the internal combustion engine 11 are fed to the exhaust gas turbine 15.

If the engine has a low compression ratio, all of the exhaust gases from the combustion chamber 17 are added to the charging air by way of the return line 20 to preheat the charging air. Additionally, the exhaust gases from th combustion chamber 17 together with the exhaust gases from the internal combustion engine 11 may be fed to the exhaust gas turbine 15 with the charging air being supplied to the internal combustion engine 11 by bypassing the charging air cooler 31.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as encompassed by the scope of the appended claims.

We claim:

1. An internal combustion engine comprising a supercharging means including an exhaust gas turbine means and a charging air compressor means, a charging air line for supplying charging air from the charging air compressor means to the internal combustion engine, a bypass line means for connecting the charging air line with an exhaust gas line, a combustion chamber means disposed in the bypass line means, a return line branching off from said bypass line means at a point located between the combustion chamber means and a connecting place of the bypass line means with the exhaust gas line, said return line terminating in the charging air line, multipath valve means being provided in the bypass line means at the branching off point of the return line for controlling the flow through a portion of the bypass line means and through said return line, wherein the exhaust gas turbine means includes selectively adjustable guide vane means for controlling the flow through the exhaust gas line, and wherein a connecting line means is arranged between the charging air line and the exhaust gas line for recycling exhaust gasses between the exhaust gas line and the charging air line, said connecting line means being connected to the exhaust gas line at a place downstream of the exhaust gas turbine means so as to supply an output of the exhaust gas turbine means to the charging air line, and in that further valve means for controlling the flow through the exhaust gas line is arranged in the exhaust gas line at a place disposed downstream of the connecting place of the connecting line means with the exhaust gas line.

2. An engine according to claim 1, characterized in that a charging air cooler means is arranged in the charging air line, and in that the bypass line means is connected with the charging air line upstream of the charging air cooler means and the return line is connected with the charging air line downstream of the charging air cooler means.

3. An engine according to claim 2, characterized in that the bypass line means is additionally connected with said connecting line means, and in that valve means are arranged in the connecting line means for controlling the flow through said connecting line means, said last-mentioned valve means being arranged in the connecting line means at a position between the connecting place of the exhaust gas line with the connecting line means and a connecting place of the bypass line means with the connecting line means.

4. An engine according to claim 3, characterized in that a further valve means for controlling flow through the connecting line means is arraned between the connecting places of the bypass line means and the charging air line with said connecting line means.

5. An engine according to claim 4, characterized in that means are provided for supplying additional combustion air to the combustion chamber means.

6. An engine according to claim 5, characterized in that said means for supplying additional combustion air includes an auxiliary blower operatively associated with said combustion chamber means.

* * * * *